United States Patent Office

3,450,523
Patented June 17, 1969

3,450,523
PROCEDURE FOR THE EXTRACTION OF MANGANESE, IRON AND OTHER METALS FROM SILICATES, METALLURGICAL WASTES AND COMPLEX MINING PRODUCTS
Grigore O. Socolescu, Bucharest, Rumania, assignor to Ministerul Industriei Chimice, Bucharest, Rumania, a firm
No Drawing. Filed Apr. 15, 1966, Ser. No. 542,730
Int. Cl. C21b 1/04; C22b 1/02, 5/12
U.S. Cl. 75—7      6 Claims

ABSTRACT OF THE DISCLOSURE

This invention relates to a process for recovering manganese, iron and other elements which occur in low grade silicious minerals, in slags, in metallurgical cinders, in complex sulfurous concentrates or in other mining products, the recovery of which, according to heretofore known processes, has proven to be uneconomical.

In the process of this invention sulfur is used to react with the elements to be extracted which are present in the ore in the form of silicates, oxides or carbonates. The ore which is to be subjected to the extraction process is mixed with flotation pyrite or any other suitable substance containing a sufficient amount of sulfur for the sulfuration of the elements which are to be extracted from the ore and with 2 to 3 percent based on the total mixture of a carbonaceous substance, the whole mixture being ground together. The ground ore is worked up under the influence of heat and in the presence of a reducing gas stream.

BACKGROUND OF THE INVENTION

Is is known that manganese, in its required industrial form, that is spiegeliron, ferromanganese, ferrosilicomanganese and metallic manganese, is generally obtained by pyro and hydrometallurgic processes, using oxide ores or carbonates which have a minimum content of 42% Mn and maximum contents of 10% Fe, 8% $SiO_2$ and 0.15% P.

In exceptional cases, concentrates of ores poor in manganese are used or natural silicious ores, or artificial ores, that is to say, metallurgic slags are used.

Processes are known which initially sulfur treat the ore in sodium sulfide leached with water. Then the solution is oxidized, roasted and finally purified and reduced.

It is also known to oxidize and roast at 1200° C. certain metallurgical manganese slags. These slags are then reduced with $H_2$ at 700° C. dissolved in $(NH_4)_2CO_3$ and separated from ammonia by distillation. It can be said that, in general, the processing of ore concentrates rich in manganese has proven heretofore to be difficult and uneconomical.

When the sulfurized roasted ore is dissolved in sodium sulfide, part of the elements are lost in the slag, and, because the melt is dissolved in water, manganese and iron sulfides change into a colloidal form in which they are precipitated by the addition of calcium or ammonium chlorides. The latter are then roasted, oxidized or reduced.

The oxidative roasting with the addition of $CaCO_3$ at 1200° C. has the disadvantage of introducing into the cycle significant amounts of unproductive materials which increase the handling costs and result in the even greater expenditure of large amounts of caloric energy.

The subsequent reduction with $H_2$ and the utilization of ammonia as a solvent results in certain operations and losses which raise the cost of production considerably.

Therefore, generally speaking, in the known processes the greatest part of iron found in the ore composition is lost.

SUMMARY OF THE INVENTION

It is a general object of this invention to provide for an economical extraction certain interesting elements found in silicious ores or in sulfurous ores with high concentration, or in metallurgical wastes.

With this object in mind the process of this invention uses sulfur to attack elements to be extracted which are present in the ore in the form of silicates, oxides or carbonates and are found in the specially worked up charge. The working up is done under the action of heat and in the presence of a reducing gas stream.

The sulfides obtained by roasting as described above, are all monosulfides and are soluble in sulfuric acid. The following classic process steps provide for the extraction from any mining product or metallurgical waste with unusually high yields.

The ore which is to be subjected to the extraction process is mixed with flotation pyrite or any other suitable substance containing a sufficient amount of sulfur for the sulfuration of the elements which are to be extracted from the ore and with 2 to 3 percent, based on the total mixture, of a carbonaceous substance, the whole mixture being ground together.

The mixture is roasted by indirect heating, at a temperature of approximately 750° C. for 30–60 minutes in a stream of a reducing gas, preferably methane.

The sulfur produced by the decomposition of the pyrite or of the substance containing sulfur, attacks the elements for which it has the necessary affinity at the temperature of the reaction and transforms them into monosulfides.

The methane gas which flows through the system, decomposes partially into $H_2$, and together with the carbonaceous substance in the charge, insures a highly reducing atmosphere in the system. The gas stream acts simultaneously on the excess sulfur which surrounds the monosulfides and entrains them as such, or as carbon disulfide. The removal of the excess sulfur around the iron monosulfides by the reducing gas stream, is necessary for the dissociation of the pyrite [$FeS_2 \rightleftharpoons FeS + \frac{1}{2}S_2$] which is a reversible reaction. The increase of temperature causes decomposition, whereas a lowering of the temperature favours the reforming of the pyrite, which is insoluble in sulfuric acid.

The reducing gas stream, which passes through the system, takes along the volatile sulfides which are removed at the temperature of the reaction that is as sulfides of As, Sb, Ge, Pb, P.

The roasted charge as described above, is treated with a solution of sulfuric acid, three products being thus obtained:

a gas, namely hydrogen sulfide
a solution, namely the sulfides of Ni, Co, Fe, Mn, Zn, Cr, Al and so on.
a residue, namely a siliceous gangue containing $PbSO_4$, CuS, Au, Ag and so on.

The gas, $H_2S$, is eventually converted to elemental S.
The solution is worked up according to known processes the most advantageous of which result in the recovery of sulfuric acid.

The residue is worked up according to known processes which are most suitable such as melting, cyanuration, electrochlorination.

No gases are lost, neither residual solutions nor slags are discarded; no other wastes which may still contain valuable elements are lost.

The iron found in the charge is practically completely extracted in the form of nearly pure $Fe_2O_3$, completely free of As.

All other elements are extracted with unusually high yields.

Example 1.—Extraction of Mn and Fe from silicates

According to the invention the charge is composed of: (a) 32% of siliceous manganese having Mn 20.14%, Fe 16.55%, $SiO_2$ 23.16%; (b) 65% of flotation pyrite having Fe 42%, S 50%, As 0.57%, $SiO_2$ 3.25%; (c) 3% of coal in powder form.

The mixture is ground to a 0.1 mm. grain size and is then homogenized; thereafter it is introduced into an indirectly heated oven of special construction, through which flows a stream of methane gas at a rate of 20 cubic meters per ton of charge.

The temperature is about 750° C. The reaction time is about 60 minutes.

The gases coming out from the oven are passed through a condenser.

The roasted material is protected against air and is dropped into a 30% sulfuric acid solution. The ratio:

$$\frac{\text{Solid (material protected against air)}}{\text{liquid (30\% sulfuric acid solution)}} = \frac{1}{3} \text{ by weight}$$

and is kept under stirring at 60–80° C. during 6 hours.

The recovered hydrogen sulfide is then converted into sulfur.

The solution is then filtered. The solution contains the sulfates of Fe, Mn, Zn, Co, Cr, Ni, Al, Mg, and so on.

The residue on the filter contains gangue, copper sulfide, lead sulfate, Au, Ag, and so on.

The solution is then crystallized. The crystals are then submitted to oxidative roasting at 600° C. The iron sulfate decomposes into $Fe_2O_3$ and $SO_2+SO_3$. The sulfurous gases are converted into sulfur by the $H_2S$ from the leach or sulfuric acid is directly reformed.

The roasted material is then leached with water and filtered. $Fe_2O_3$ remains on the filter. From the solution of sulfates, from which the iron has disappeared, the various metals are separately extracted, by ion exchangers, or by any other suitable known means.

The sulfate of manganese may be electrolyzed or submitted to thermal decomposition in order to obtain $Mn_3O_4$, with the recovery of $SO_2+SO_3$.

The working up of the residue may be effected in different ways: by melting, electrochlorination, cyanuration, and so on, the method selected being the best suited for the desired quality of the end product.

The extraction of manganese and iron according to the process of this invention is higher than 95%.

Example 2.—Extraction of poor gold pyrites

According to this invention the charge is composed of: (a) 97% of poor gold pyrites having S 50%, Fe 42%, Cu 0.5%, Zn 1%, As 0.5%, $SiO_2$ 3%, Au 18 grams/ton, Ag 90 grams/ton; (b) 3% of coal in powder form.

The mixture is homogenized; then it is introduced into an indirectly heated oven of special construction, through which flows a stream of methane gas at a rate of 20 cubic meters/ton of charge.

The temperature is about 750° C. The reaction time is about 60 minutes.

The gases coming out from the oven are passed through a condenser, the material being protected at all times against the ambient air. The material is dropped into a 30% sulfuric acid solution while the following ratio:

$$\frac{\text{Solid (material protected against air)}}{\text{liquid (30\% sulfuric acid solution)}} =$$

⅓ by weight is maintained

The solution is kept under stirring at 60–80° C. during 6 hours.

The recovered hydrogen sulfide is then converted into sulfur.

The solution is then filtered. The solution contains the sulfates of: Fe, Zn, Co, Ni, and so on. The residue on the filter contains gangue, copper sulfide, lead sulfates, Au, Ag, and so on.

This residue weighs about 20% of the worked up charge and contains approximately: S 3%, Fe 2%, Cu 2%, SiO 11%, Au 90 gram/ton, Ag 350 grams/ton.

The processing of such a material may be done anyway, with very good extraction yields and economic results.

The solution of the metallic sulfates is crystallized and submitted to oxidative roasting at 600° C. The resulting $SO_2+SO_3$ are converted to sulfur or sulfuric acid. The "leach solution" is filtered. On the filter remains high purity $Fe_2O_3$. The remainder of the sulfates in the solution is separated by known processes.

Example 3.—Extraction of Mg, Al, Ni, Fe, Cr, etc. from silicates

According to this invention, the charge is composed of: (a) 50% of nickeliferous serpentine having MgO 26%, $Al_2O_3$ 2.1%, $Fe_2O_3$ 10%, Ni 0.2%, SiO 30%; (b) 47% of pyrite having S 50%, Fe 42%, $SiO_2$ 3%, Cu 0.5%, Zn 1%, As 0.5%; (c) 3% of coal in powder form.

The materials are ground to 0.1 mm. grain size and are then homogenized; then they are introduced into an indirectly heated oven of special construction, through which flows a methane gas stream at a rate of 20 cubic meters per ton of charge.

The temperature is about 750° C. The reacting time is about 60 minutes.

The gases coming out from the oven pass through a condenser.

The roasted material is protected against air, and is dropped into a 30% sulfuric acid solution. The ratio:

$$\frac{\text{Solid (material protected against air)}}{\text{liquid (30\% sulfuric acid solution)}} = \frac{1}{3} \text{ by weight}$$

and is stirred at 60–80° C. during hours.

The recovered hydrogen sulfide is then converted into sulfur.

The solution is then filtered. It contains the sulfates of Mg, Fe, Al, Ni, Zn, Co, Cr, etc.

The residue on the filter contains gangue with copper sulfide, lead sulfate, etc.

The solution is then crystallized. The crystals are submitted to oxidative roasting at 600° C. The iron sulfate decomposes into $Fe_2O_3$ and $SO_2+SO_3$. The sulfurous gases are converted into sulfur by the $H_2S$ from leach or sulfuric acid is directly reformed.

The roasted product is then leached with water and filtered. On the filter remains $Fe_2O_3$. From the sulfate solution, out of which iron has disappeared, the metals are separately extracted, by ion exchangers especially Ni, or by other known means.

The thermal decomposition may be successfully applied because between the decomposition temperatures of the sulfates there are big differences. Thus:

| | Decomposure temperature, ° C. |
|---|---|
| $FeSO_4$ | 167–480 |
| $Al_2(SO_4)_3$ | 590–639 |
| $ZnSO_4$ | 720 |
| $MgSO_4$ | 890–972 |

On the one hand sulfuric acid is recovered and on the other hand readily marketable oxides are obtained.

The residue is worked up, according to known methods for the extraction of elements it contains.

Example 4.—Obtainment of concentrates rich in germanium

According to this invention the charge is composed of: (a) 93% of ore poor in germanium—Ge 20 grams/ton, Sb 1000 grams/ton, As 1000 grams/ton, $SiO_2$ 80%; (b) 4% of sterile pyrite with approx. 45% S; (c) 2% of coal.

The materials are ground to 0.1 mm. grain size. Then they are homogenized, and then introduced into an indirectly heated adequate oven, having a temperature of 800° C. through which flows a stream of methane gas, approximately at a rate of 20 cubic meters/ton of charge.

The sulfur which is recovered from the pyrite, under the action of heat, attacks the elements contained in the charge and transforms them into sulfides. Those substances which are volatile at this temperature are carried along by the gas stream and evacuated from the oven successively, as they are formed.

By adequate condensation the volatile substances are deposited and constitute a concentrate rich in Ge, Sb, and As.

This invention provides a process for the economic extraction of Mn and Fe from any siliceous ores or sulfurous ores, in pure state, without As and P.

By making use of the process of this invention, several and important deposits of Mn and Fe or of Fe silicates can be put to good use, if pyrite or other substances containing sulfur are cheaply available.

The process of this invention further provides for an economical exploitation of any deposits of pyrites containing gold.

The process of this invention makes it possible to extract all the elements contained in metallic sulfides, with very high extraction yields, notwithstanding their complexity or the concentration of the ores.

The process of the invention has made the operation of the flotation plants more economical by simplifying operations and reducing the loss of metals, by the working up of the complex, finely dispersed sulfides from a single collective concentrate.

Furthermore, the process of this invention avoids the production of pyrite cinders, which contain big amounts of valuable elements, which when worked up, yield unsatisfactory and expensive products.

In addition thereto the process of the invention provides for the economical recovery of some Mg, Al, Ni, Ge deposits, for which the present state of technique offers no economical solutions.

The process of the invention provide for the recovery of sulfur contained in pyrites, in the state of a pure element, which can be more profitably transported and may be worked up into sulfuric acid at the place of its use, in simpler plants and at a lower cost.

In general the process of this invention makes use of a simpler and fewer operations, at normal pressure, moderate temperatures, and needs a shorter time of manipulation, in installations which may be automatized, than the heretobefore known extraction processes.

The process of the invention is independent of any import products, because the single reactant that is required is sulfuric acid, which is continuously recirculated and is produced from raw materials which are used in the process.

I claim:
1. A process for recovering the metal content from material consisting of natural or artificial low grade ores, slags and silicates, comprising the steps of:
  (a) mixing said material, sulfur containing substances and carbonaceous material,
  (b) homogenizing said material; and
  (c) roasting said homogenized material at a temperature of about 750° C.

2. The process as set forth in claim 1 wherein said sulfur containing substance is selected from the group of pyrite, and complex sulfides.

3. The process of claim 2 wherein the methane gas is passed countercurrently over said homogenized material while it is being roasted thereby entaining any excess sulfur that is being formed.

4. The process as set forth in claim 3, wherein said homogenized material is converted primarily into iron monosulfide, and wherein the said roasted material is dropped into a solution of sulfuric acid, having a concentration of about 20%–40% and a temperature of about 60–80° C.

5. The process as set forth in claim 4, wherein said methane gas aids in the conversion of the metals present in said material into metal sulfides at least a portion of which are volatile and entrains those which are volatile.

6. The process as set forth in claim 5 wherein said metals present in said material and converted into metal sulfides are selected from the group of As, P, Ge, and Sb.

References Cited

UNITED STATES PATENTS

| | | | |
|---|---|---|---|
| 1,103,657 | 2/1929 | Betts | 75—80 |
| 3,004,846 | 10/1961 | Queneau | 75—21 |
| 949,002 | 2/1910 | Ramage | 75—2 |
| 1,486,256 | 3/1924 | Merryweather | 75—116 |
| 2,197,185 | 4/1940 | Kissock | 75—116 |
| 2,860,967 | 11/1958 | Schlecht et al. | 75—116 |
| 3,322,532 | 5/1967 | Wieder | 75—116 |

FOREIGN PATENTS 12,155  4/1934  Australia.

L. DEWAYNE RUTLEDGE, *Primary Examiner.*

E. L. WEISE, *Assistant Examiner.*

U.S. Cl. X.R.

75—21, 24